(12) United States Patent
Baum et al.

(10) Patent No.: US 7,082,227 B1
(45) Date of Patent: Jul. 25, 2006

(54) PRODUCING PRINTED IMAGES HAVING PERSONALIZED FEATURES

(76) Inventors: Daniel R. Baum, 685 San Mateo Dr., Menlo Park, CA (US) 94025; Xin Wen, 1093 Tanland Dr., Apt. 205, Palo Alto, CA (US) 94303

( * ) Notice: Subject to any disclaimer, the term of this patent is extended or adjusted under 35 U.S.C. 154(b) by 0 days.

(21) Appl. No.: 09/565,852

(22) Filed: May 5, 2000

Related U.S. Application Data

(60) Provisional application No. 60/170,371, filed on Dec. 13, 1999, provisional application No. 60/167,675, filed on Nov. 29, 1999, provisional application No. 60/167,243, filed on Nov. 24, 1999.

(51) Int. Cl.
*G06K 9/03* (2006.01)

(52) U.S. Cl. .................. 382/311; 348/231.6; 705/26

(58) Field of Classification Search .......... 382/309, 382/310, 311, 167; 358/504, 506; 348/231.6; 705/26
See application file for complete search history.

(56) References Cited

U.S. PATENT DOCUMENTS

| | | | | |
|---|---|---|---|---|
| 5,477,264 A | * | 12/1995 | Sarbadhikari et al. | ... 348/231.6 |
| 5,687,259 A | * | 11/1997 | Linford | ...... 382/294 |
| 5,854,850 A | * | 12/1998 | Linford et al. | ...... 382/128 |
| 5,963,916 A | * | 10/1999 | Kaplan | ...... 705/26 |
| 6,017,157 A | * | 1/2000 | Garfinkle et al. | ...... 396/639 |
| 6,043,909 A | * | 3/2000 | Holub | ...... 358/504 |
| 6,097,471 A | * | 8/2000 | Buhr et al. | ...... 355/38 |
| 6,396,599 B1 | * | 5/2002 | Patton et al. | ...... 358/1.9 |
| 6,459,511 B1 | * | 10/2002 | Haneda | ...... 358/506 |
| 6,690,843 B1 | * | 2/2004 | Squilla et al. | ...... 382/306 |
| 6,784,924 B1 | * | 8/2004 | Ward et al. | ...... 348/207.1 |

* cited by examiner

*Primary Examiner*—Jingge Wu
*Assistant Examiner*—Aaron Carter
(74) *Attorney, Agent, or Firm*—Xin Wen

(57) ABSTRACT

A method for personalizing an image-based physical manifestation to conform with user preferences for image processing. In one implementation, the method includes identifying an image for processing, identifying user preferences for image processing and processing the image including manipulating image data for the image in accordance with the user preferences.

26 Claims, 9 Drawing Sheets

PRODUCING PRINTED IMAGES HAVING PERSONALIZED FEATURES

This application claims benefit of and priority from provisional application 60/167,243, filed Nov. 24, 1999, 60/167,675, filed Nov. 29, 1999 and 60/170,371, filed Dec. 13, 1999.

Priority is claimed from United States Provisional Patent Application Ser. No., 60/170,371 filed Dec. 12, 1999 entitled "User Interface for Online Printing Service."

TECHNICAL FIELD

The present application relates generally to image based products and more specifically to producing printed images in accordance with user personalization information.

BACKGROUND

Images can be generated in several ways. For example, an image can be captured using a film or digital camera and/or created and edited using image processing software such as ADOBE PHOTOSHOP® or the GNU IMAGE MANIPULATION PROGRAM ("GIMP"). Images captured using a film camera typically are stored as film negatives. Images captured using a digital camera typically are stored as digital files residing in the memory of a digital camera and/or a storage medium to which the file has been transferred (for example, a hard drive or CD ROM). Images created using image processing software are typically stored as a digital file residing on a computer readable medium such as a hard drive.

An image-based product can be generated from such stored images. As used here, the term "image-based product" refers to an item, regardless of medium, that includes a visual representation of at least a portion of one or more images. One example of an image-based product is an image print (also commonly referred to as a "photograph"). For example, a user can take a picture using a conventional film camera and then bring the exposed film to a photo-finishing laboratory to have the laboratory develop the exposed film and generate an image print.

The image-based product is often a physical manifestation of the digital content. The physical manifestation of the digital content may include photographic prints of the one or more digital images, framed photographic prints, photo-album pages bearing one or more digital images, compositions of digital images and other graphical and/or textual content, and/or artifacts bearing a digital image such as a novelty item, a shirt, a coffee mug, a key-chain, a mouse pad, a magnet, or a deck of playing cards.

When a customer wishes to have a high-quality image print generated from a digital image, the customer need not physically take the digital image to a photo-finishing laboratory and instead can electronically transmit the digital image to an "online" photo-finishing laboratory using a computer network such as the Internet. For example, the customer can use an Internet browser program (referred to herein as a "browser") such as NETSCAPE NAVIGATOR®. The customer can direct the browser to a web site associated with the online photo-finishing laboratory and upload the digital image to a server hosting the web site. The online photo-finishing laboratory can then take the digital image from the web server and produce a high-quality image print from the digital image in a conventional manner. The online photo-finishing laboratory then typically sends the high-quality image print to the customer using a delivery service such as the UNITED STATES POSTAL SERVICE or FEDERAL EXPRESS®.

Different customers may have different preferences (referred to hereafter as "image preferences") in the color or tone of the printed images. These preferences may vary from individual to individual, among groups based on age, region, culture, professional training, and other factors. For example, some customers may prefer their printed images to look warmer or cooler. "Warm", as used herein, describes an image with colors slightly shifted to red or yellow. Similarly, "cool" or "cold" as used herein, refer to an image with colors slightly shifted to blue or cyan.

In another example, one customer may prefer more saturated colors while another customer may prefer softer colors. An individual's preferences also may vary according to the types of scenes in the printed images. For instance, some customers may prefer saturated colors for use with landscape images. Customers may want wedding pictures to be printed with softer and warmer colors to produce a romantic atmosphere.

Consumers in different regions of the world may have different "regional" color preferences. For example, consumers in Asian countries on the average may prefer more saturated colors, whereas consumers in Northern America may prefer warm colors.

Despite the need for image preferences as described above, conventional photofinishing technologies have not fulfilled these needs. Conventional mass-produced photographic film and paper are designed to produce tone and color properties that are generally pleasing to the majority of customers. This design inevitably causes trade-offs among different customers for each photographic film or paper product. As described above, one product cannot satisfy all customers.

In professional photography, the photographer can choose specific film and paper types that are optimized toward each subject matter (e.g. portrait). Such an approach is beyond the skill and the financial means of a typical consumer.

A customer can use commercial image processing software such as PhotoShop by Adobe Systems, Inc. of San Jose, Calif., to make adjustments to image preferences prior to printing. However, the adjustment process can be complex and time consuming and may require technical knowledge of, for example, image sciences, that is outside the skill set of a typical customer. Often a customer is required to produce several trial prints before a printed image with reasonable quality is obtained. Furthermore, trial and error techniques can be expensive or impractical when the images are printed at a remote location.

SUMMARY

In one aspect, the invention provides a method for personalizing an image-based physical manifestation to conform with user preferences for image processing. The method includes identifying an image for processing, identifying user preferences for image processing and processing the image including manipulating image data for the image in accordance with the user preferences.

Aspects of the invention can include one or more of the following features. The user preferences can include preferences for tone to be used in processing the image. The user preferences can include preferences for color to be used in processing the image. The image preferences can include a style specification defining a group of one or more individual preferences to be applied to the image.

The processing step can be performed by an online photofinishing service. The user preferences can be global preferences to be applied to all image-based products processed by the online photofinishing service. The method can further include identifying image preferences associated with the image defining user preferences to be applied when processing a particular image. Processing the image can include manipulating image data for the image in accordance with the image preferences.

The method can include previewing on a display the processed image having the user preferences or a printed image having the user preferences.

In another aspect the invention provides a method for delivering an image-based product to a customer. The method includes inferring user preferences for the processing of the image-based product from one of user identifying data or use data, personalizing the image-based product including applying one or more user preferences to be used in the image processing of the image-based product and delivering the personalized image-based product without requiring the user to select the user preferences.

In another aspect the invention provides a method for delivering an image-based product to a customer by an on-line photofinishing service. The method includes personalizing the image-based product including applying one or more user preferences to be used in the image processing of the image-based product and delivering the personalized image-based product without requiring the user to select the user preferences.

Aspects of the invention can include one or more of the following features.

The method can include inferring user preferences from user usage information. The method can include presenting the user with variations on the user preferences including displaying the effect produced by a particular user preference selection. The preference can be a style. The preference can define a user-based preference to be applied to all image-based products produced by the online photofinishing service for the user. The preference can be associated with an individual image and can be used only for processing that particular image. The preference can be associated with an image transform to be applied in the personalizing step. The image transform can be an ICC profile. The ICC profile can be provided by the user.

The method can include storing the preferences in a database. The database can include preference data and image data. The preference can include a selection for tone, color, input ambient conditions, color balance, output medium of the personalized image-based product or effects.

The method can include receiving an image from a first person and delivering a processed version of the image to a second person whose preference is applied. The method can include inputting the preference from the web or acquiring the preference from use history on a browser. The method can include previewing on a display the processed image having the user preferences. The method can include previewing a processed image having the user preferences.

In another aspect the invention provides a method for producing an image-based product to a customer by an on-line photofinishing service. The method includes acquiring the customers' preference from the customer's use history and processing the image-based product in response to the acquired user preferences to produce a personalized image-based product.

Aspects of the invention can include one or more of the following features. The preference can be acquired from the user history on a web browser or from a database.

In another aspect the invention provides a method for delivering an image-based product to a customer. The method includes personalizing the image-based product including applying one or more user preferences to be used in the image processing of the image-based product. Personalizing the image-based product includes identifying image data associated with the image-based product, identifying one or more user preferences for image processing and an associated image transform for each and processing the image data including applying each image transform in a sequence to the image data to produce personalized image data. The method includes memorializing the personalized image data in a physical manifestation and delivering the physical manifestation to the customer.

In another aspect the invention provides an image database associated with a on-line photofinishing service for storing image data. The database includes a user data structure including user preferences for image processing, the user preferences defining a generalized set of preferences of the user to be used in processing any image by the on-line photofinishing service and an image data structure including image data and image preferences, the image preferences defining a set of preferences for a particular image to be used in processing the particular image by the on-line photofinishing service.

In another aspect, the invention provides a personalization architecture for use by an on-line photofinishing service to produce a personalized image-based product. The personalization architecture includes one or more preference layers. Each preference layer is associated with a preference type and includes one or more selections for specifying a preference of the user with respect to the preference type. Each selection has an associated filter defining an image operation that produces a result in conformance with the user's preference type selection when applied to image data associated with the image-based product.

In another aspect the invention provides a system for personalizing an image-based product for delivery to a customer. The system includes a personalization architecture including one or more preference layers. Each preference layer is associated with a preference type and including one or more selections for specifying a preference of the user with respect to the preference type. Each selection has an associated image transform defining an operation that produces a result in conformance with the user's preference type selection when applied to image data associated with the image-based product. The system includes an image processor operable to evaluate the personalization architecture for the image-based product, identify each selection for each preference layer including identifying an associated image transform for each selection, apply the identified image transforms in a sequence to image data associated with the image-based product and produce personalized image data. The system includes a delivery service for processing the personalized image data to produce the image-based product.

Aspects of the invention can include one or more of the following advantages. The present invention provides an easy method to deliver image preference performance to the common consumer without the difficulties encountered in the prior art. The present invention provides printed images according to the personal preference of the customer. Specifically, customers upload digital images to an on-line photofinishing provider. The customer can select or create their preferred color or tone characteristics on the Internet. The on-line photofinishing provider subsequently processes the digital images in response to the customers' preferred color or tone characteristics. As a result, the printed images are more satisfactory to the customers.

The system allows for customization in the imaging process with controls far better than conventional customer output options available with conventional photography processes (e.g., silver halide film processes).

Another advantage of the present invention is that each individual's preferences can be automatically recorded and repeatedly applied in order to provide convenience to the customer.

Yet another advantage of the present invention is that the quality of the printed images can be optimized by receiving from the customer information about the image capture such as scene and illumination information so that each individual image can be tailored to present the best quality.

A further advantage of the present invention is that a combination of preferences and image-type information can be grouped and recorded as a preference style. The preference style can be applied to any number of images producing results that are pleasing to the customer and readily reproducible.

The details of one or more embodiments are set forth in the accompanying drawings and in the description below. Other features, objects, and advantages of the invention will become apparent from the description and drawings, and from the claims.

DRAWING DESCRIPTIONS

Like reference numbers and designations in the various drawings indicate like elements.

DETAILED DESCRIPTION

Figure 1:
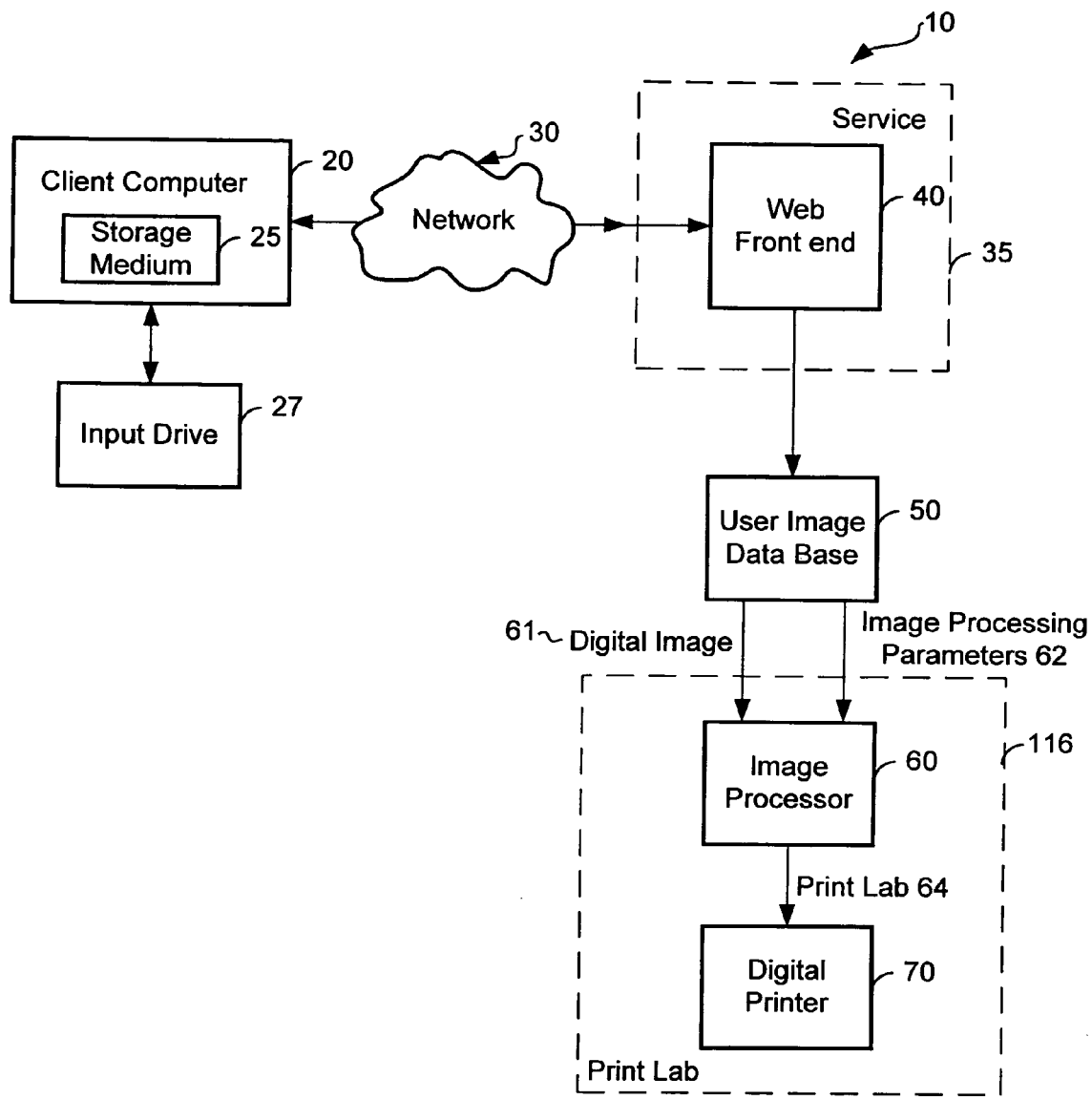
FIG. 1 is a block diagram of a system for generating image-based products from digital images in accordance with the personal preferences of a user.

FIG. 1 is a block diagram of a system 10 for generating image-based products from digital images in accordance with the personal preferences of a user. System 10 includes a server 35 that is connected to one or more client computers 20 by a network 30 such as the Internet. The client computers 20 can be connected to an input device 27 so that a user can upload captured digital images from the input device 27 to the client computer 20. The input device can be a digital camera, a scanner for scanning reflective printed images, or a film scanner.

Alternatively, or in addition, the client computer 20 can execute image processing software such as ADOBE PHOTOSHOP® or the GIMP in order to create and/or edit digital images. The client computer 20 includes a storage medium 25 such as a hard disk for storing the digital images. The client computer 20 can be implemented using a variety of hardware and software. For example, the client computer 20 can be a general-purpose device such as a personal computer, portable computer, or portable digital assistant ("PDA") or as a special-purpose device such as a point-of-sale kiosk having an embedded computer.

The client computer 20 is connected to the network 30, for example, using a modem or network interface card. The system 10 can be implemented as a browser-based system in accordance with the standard protocols for communicating over the Word Wide Web. In such an implementation, a user of the client computer 20 can execute a browser to connect to and interact with the server 35. The server 35 includes a web front end 40 that manages the communications with the client computer 20. The user of the client computer 20 can upload digital images to the server 35. The web front end 40 receives the uploaded digital images and stores them in a user image database 50.

The user of the client computer 20 can also order image prints made from selected images. The server 35 includes, or is connected to, a print lab 116. The print lab 116 includes an image processor 60 and one or more digital printers 70. The image processor receives selected images 61 from the user image database 50 along with image processing parameters 62. The image processing parameters 62 include customer specific preference data. Image processor 60 includes one or more engines for operating on the selected images 61 in accordance with the image processing parameters 62 specified for the customer. An appropriate digital printer 70 is provided with a print job 64 that can be used to generate image prints from the selected images in accordance with the preference data. The print lab 116 can generate other image-based products. For example, the print lab 116 can frame image prints in one or more frames selected by the user and/or print or otherwise embody the selected images in other items such as clothing, buttons, mugs, cards, invitations, and calendars. The items generated by the print lab 116 can be shipped to the user using a conventional shipping service such as the UNITED STATES POSTAL SERVICE or FEDERAL EXPRESS®. Commonly assigned co-pending U.S. patent applications Ser. Nos. 09/428,871 (entitled "MULTI-TIERED IMAGE DATABASE" and filed Oct. 27, 1999), 09/436,704 (entitled "DISTRIBUTING IMAGES TO MULTIPLE RECIPIENTS" and filed Nov. 9, 1999), and 09/450,075 (entitled "PRINTING IMAGES IN AN OPTIMIZED MANNER" and filed Nov. 29, 1999), all of which are incorporated herein by reference, disclose various approaches to implementing a system 10 for generating image-based products from digital images.

Figure 2:
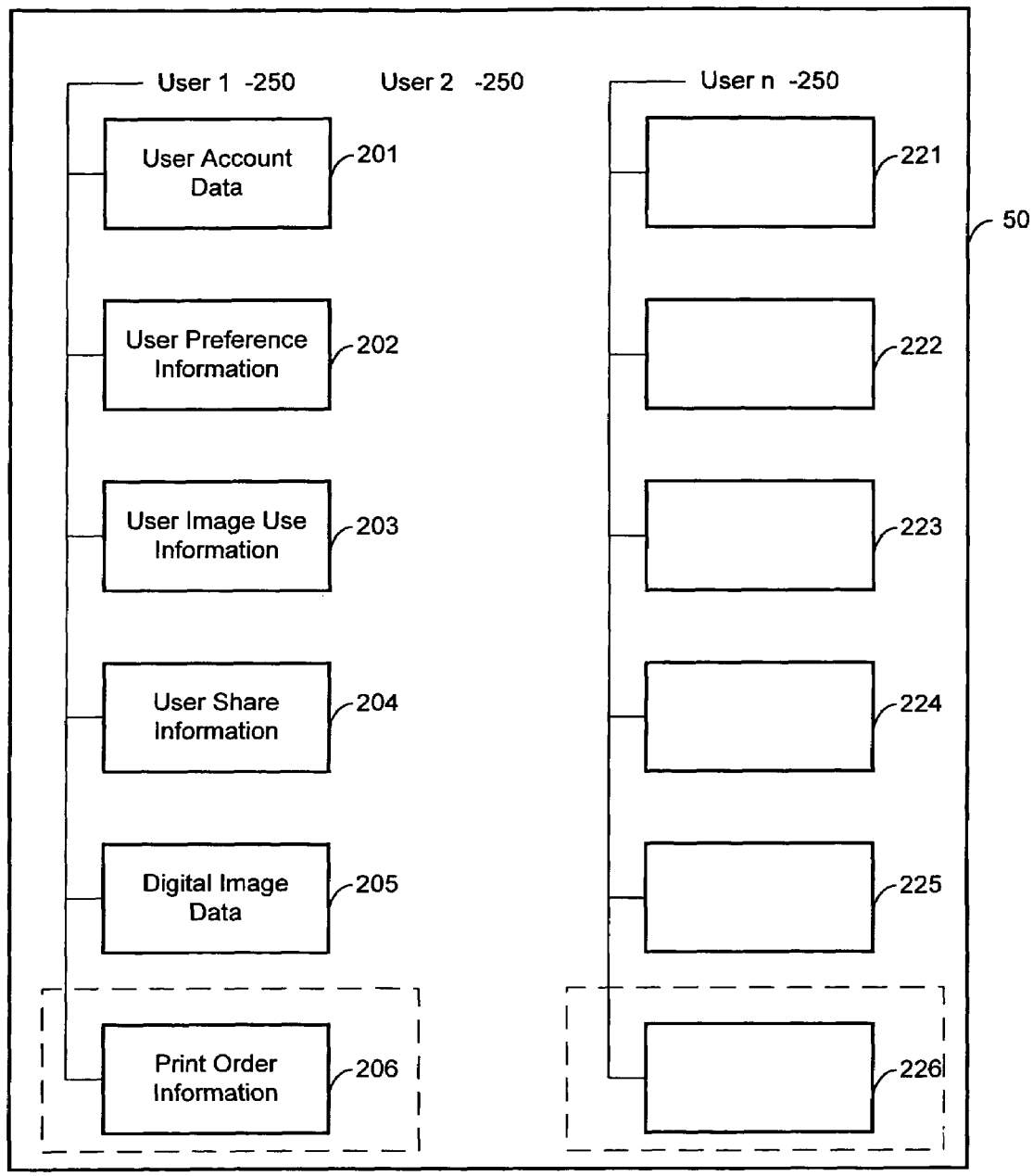
FIG. 2 is block diagram of the user image database of FIG. 1.

FIG. 2 is block diagram of the user image database 50 of FIG. 1. The user image database 50 can include a plurality of user account data structures 250 including account information for a user (e.g., user 1, user 2, ... user n). Each user account data structure 250 includes information specific to that particular user. In one implementation, each user account data structure 250 includes user account data 201, user preference information 202, user image use information 203, user share information 204, digital image data 205 and print order data 206.

User account data 201 includes general information concerning the user (e.g., name, address, shipping options, payment options) and may include other user identifying data such as age, profession, region, and ethnic or culture interests.

Customer preferences for image processing can be user-based or image-based. User-based preferences are global preferences associated with a customer. In one implementation, all user-based preferences are stored in user preference information 202. User-based preferences can include the user's preference on image qualities such as color and tone. For example, the user may prefer warm colors with a high degree of saturation. In another example, the user's preference on color balance and tone can be related to the different skin tones that are most frequently appearing in the user's images. The preference information can be used to avoid processing light skin tones with too low density and dark skin tones with too high density.

The user preference information 202 can include preference information for more than one user. For example, a customer's account can include several family members and friends who all may receive images from the single account. A digital image can be processed and printed in such a way that is tailored for each individual user. For example, the same image can be processed differently depending on whether it is viewed or processed for a teenager or a grandparent. The digital image can be produced by one person (e.g. the camera owner), while the printed image can be received and viewed by a different person (e.g. family member or friend). The user preference information 202 for the person receiving the printed or displayed image is used in the image processing operations for enhancing image quality for the specific viewer. The term "image quality," as used herein, refers to the image features such as color, tonal curve (contrast, curve shape), dynamic range (maximum and minimum densities), and sharpness. The use of the image processing information is described in greater detail below in association with FIG. 5a.

User image use information 203 includes history or patterns of use for the particular customer. For example, information relating to ordering patterns or use patterns for particular images can be gathered and stored. Typically, use information is gathered by server 35 or by an external processor that manages or otherwise oversees transactions on the system 10. Information gathered can include: the time of the year (near certain holidays or birthdays) when images are captured, uploaded, and ordered for printing. The user image use information 203 can also include a geographic region designator for use in indicating where most of the images from the user are captured. The latitude and the weather pattern as well as time in the geographic location can be used to obtain or estimate the outdoor daylight or illumination conditions and color temperature of such illuminations. Such information can be used to personalize the image processing so as to deliver a personalized image-based product as described in greater detail below in association with FIG. 5a.

User share information 204 includes information on how the customer has shared images stored in the user image database 50, including the user's sharing of printed images or digital images.

The user image database 50 can also include print order information 206. Print order information 206 can include the time and number of prints in each order, as well as payment information.

Figure 3:
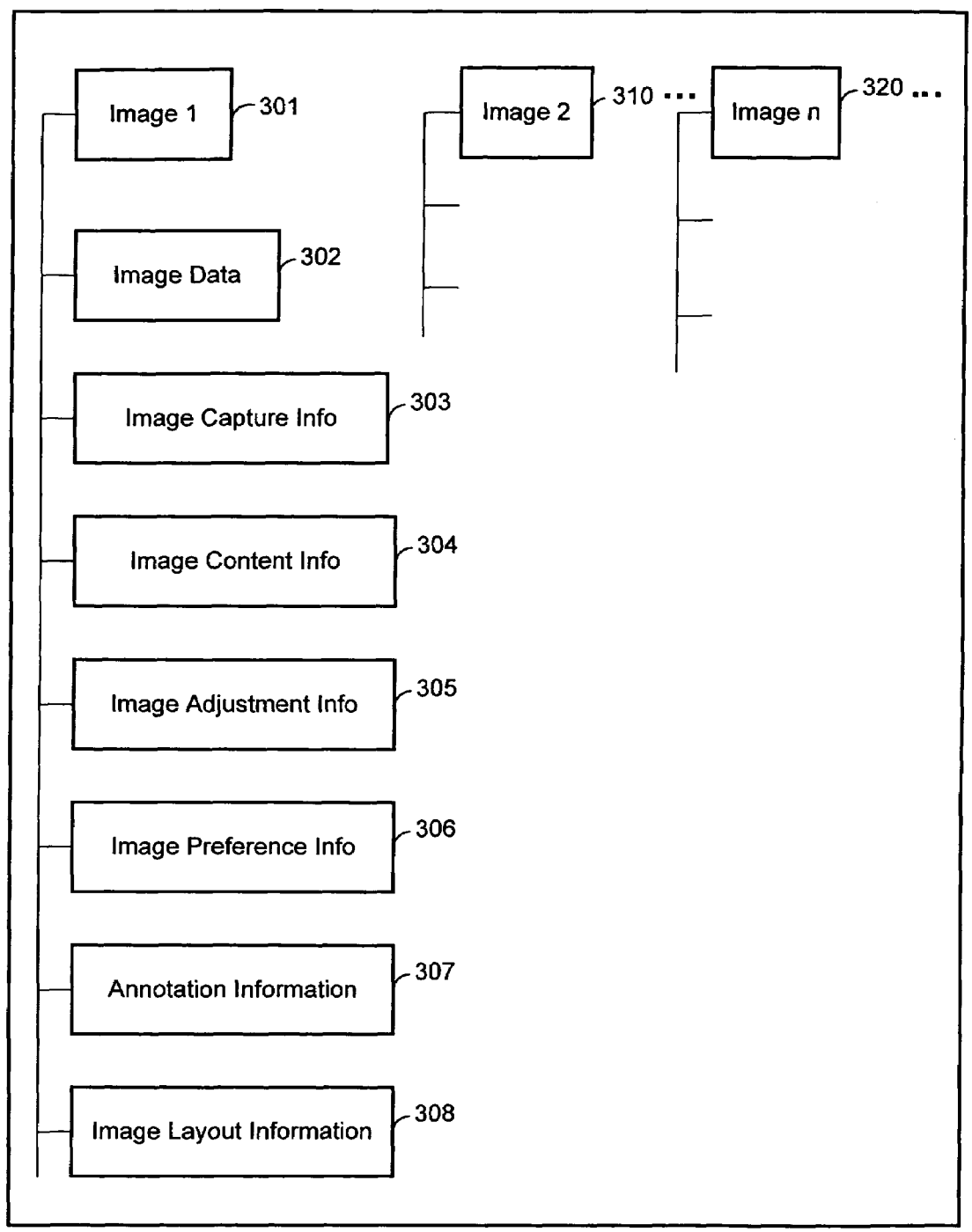
FIG. 3 is block diagram of the digital image database of FIG. 2.

Image data is stored in digital image data area 205. The digital image data area 205 can include image data, preferences, capture, adjustment and other information that is specific to a particular image. Referring now to FIG. 3, digital image data area 205 includes one or more digital image data structures 301. The digital image data structure 301 includes image data 302, image capture information 303, image content information 304, image adjustment information 305, image preference information 306, annotation information 307 and image layout information 308.

Image data 302 includes the digital image that has been uploaded or otherwise received for processing. The image data can be in a compressed or uncompressed form.

Image capture information 303 includes camera type, capture speed and illumination condition such as day light, fluorescent, Tungsten, or flash light exposure.

Image adjustment information 305 includes definitions for image processing operations that are to be applied to the image such as color and tonal adjustment, sharpening, cropping and the like. These adjustments can be defined by image processing software resident on the customer's client computer such as Adobe Photoshop, or image processing software that is accessed from the online photofinishing provider such as Shutterfly, Inc. reachable on the web at Shutterfly.com. In the prior case, the image quality of the printed image can be simulated by displaying each processed image on a display at the user's client computer prior to connecting to the online photofinishing provider. The history of the image adjustments can be automatically recorded in the user image use information 203 and sent together with image data to the online photofinishing provider and stored in image adjustment information 305. In simulating the printed image, the user's display is preferably calibrated.

Image preference information 306 can include preferences specific to the image content. In certain images, the user may prefer to adjust the color and tone to optimize the main subjects in the image. The main subject maybe a person or a house, whose image quality can be enhanced at a slight trade-off with respect to the other objects in the image. In one implementation, image-based preferences are stored in the image preference information 306. The image-based preferences can be of the form of an image style. An image style is a named set of image preferences that can be applied to one or more images. When the image style is applied to a selected image, all of the image preferences in the set are applied to the selected image by the image processor 60.

Annotations or other textual or graphical additions to be applied to any surface of the image-based product can be stored in the annotation information 307. For example, annotations can be applied to the back of an image print in a process referred to as backprinting. Backprinting is described in greater detail in co-pending United States Patent Application entitled "Backprinting Image Prints", filed Nov. 29, 1999 and assigned Ser. No. 09/450,899, the contents of which are expressly incorporated herein by reference.

Layout and other output information can be stored in image layout information 308. For example, the user can specify one or more mattes, frames or border effects to be applied to a periphery of a selected image. The specification of layout designs is described in greater detail in copending application entitled "System and Method of Changing Attributes of an Image-based Product", filed Apr. 28, 2000 and assigned serial number (unknown), the contents of which are expressly incorporated herein by reference.

Image Offering

Figure 4A:
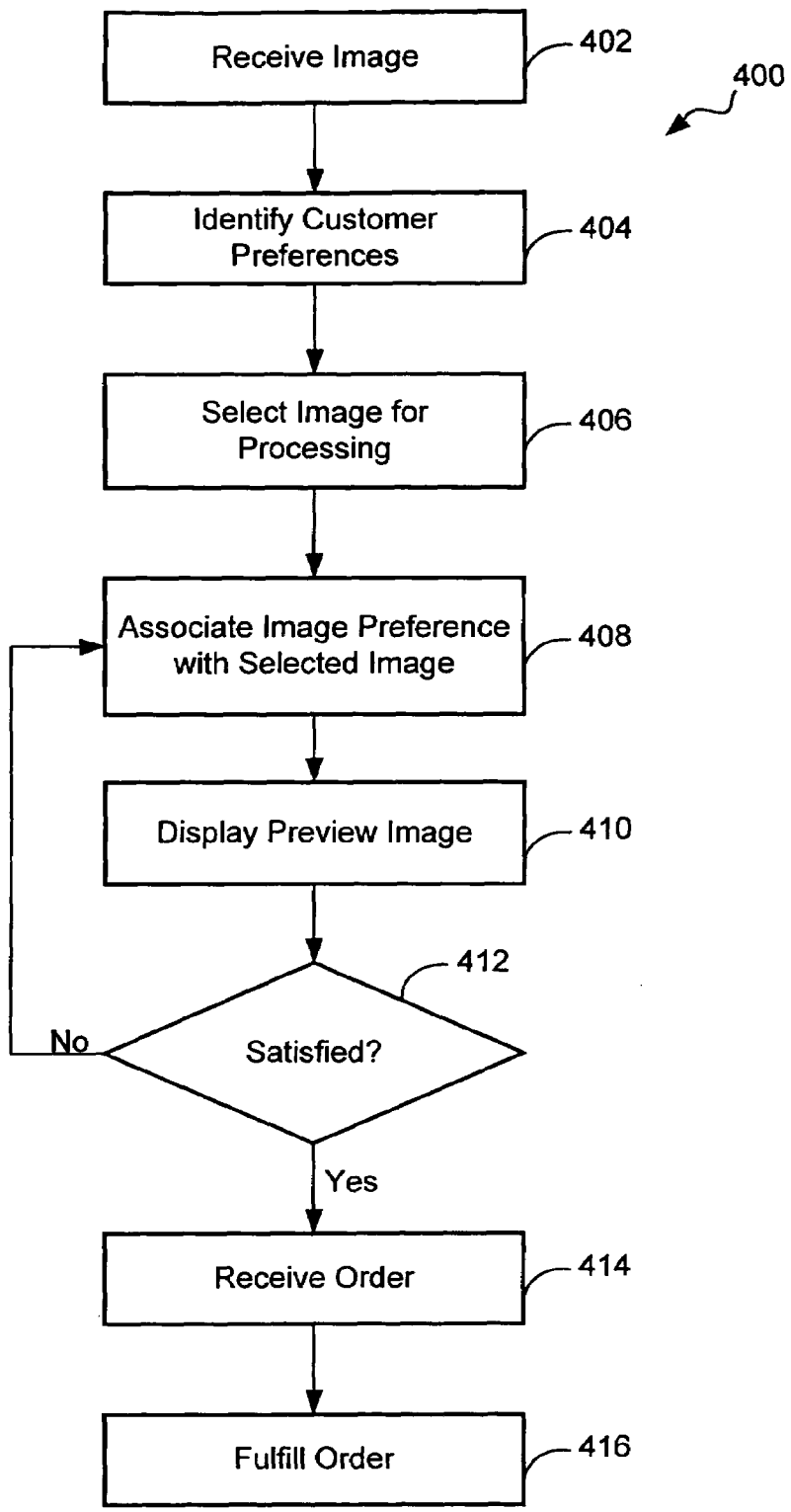
FIG. 4a is a flow diagram of a high-level process 200 for offering image-based products for sale over a computer network.

FIG. 4a is a flow diagram of a high-level process 400 for offering image-based products in accordance with user preferences for sale over a computer network such as the Internet (e.g., using system 10 shown in FIG. 1). First, an image is received (block 402). For example, a user executing a browser on the client computer 20 can access the web front end 40 of the server 35 and upload a digital image to the server 35. The server 35 receives the uploaded image, which the user can select for subsequent processing as described below. The uploaded image can be stored in the user image database 50. The web front end 40 can be configured to allow the user to view images stored in the user image database 50 on the client computer 20, select user preferences and image preferences for image processing and select one or more images for subsequent processing.

Figure 4B:
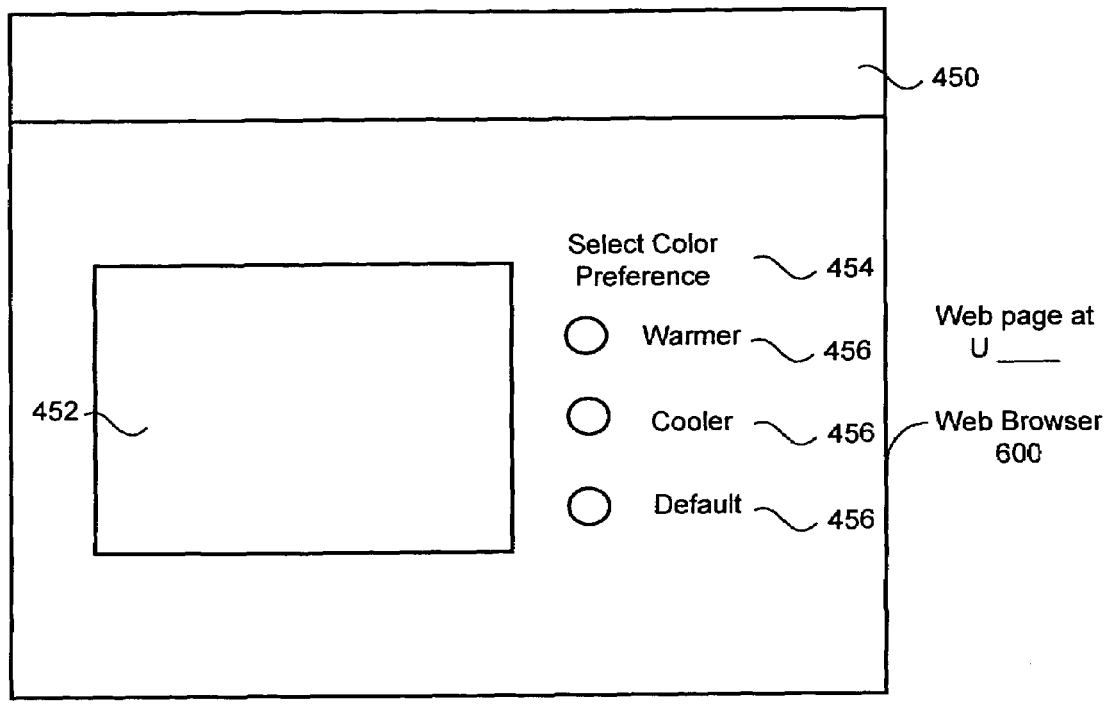
FIG. 4b shows an example of a user interface that enables users to input user preferences.

Customer preferences for image processing are identified (block 404). In one implementation, the customer manually selects a set of customer preferences. Alternatively, the customer preferences can be inferred from information gathered about the user (e.g., use information or personal information) or a default set of customer preferences can be selected. FIG. 4*b* shows one example of a user interface 450 that can be used to allow a customer to select customer preferences for image processing. The user interface can include a preview window 452 for presenting an image stored in the user image database 50. In addition, the user interface 450 includes a preference item 454 and one or more possible selections 456. The user interface 450 can be configured in a conventional manner so that a user can select a particular customer preference by clicking on a selection presented in the interface. An item menu (not shown) can be manipulated to scroll through the various customer preference items. As described above, the preview window 452 can present an image. The image can be processed based on the customer selection to provide a visual feedback to the customer for a given selection. In addition, or instead, the user interface 450 can include a plurality of buttons 458 (not shown)(or other user interface controls such as text boxes, drop boxes, spin controls etc.) associated with one or more preference items stored in the user image database 50. A customer can click on (or otherwise actuate) one of the buttons 458 in order to select the one or more customer preferences associated with that button 458. The preview image can then be processed in accordance with the selection and presented to the customer in the preview window. The user preferences can be received and selected in other ways, including for example, by a default specification, or by inferring a selection based on customer information or use patterns.

As described above, the effects of the image preferences can be illustrated to the user through the user's web browser or alternatively on a physical print. For example, an image can be presented in neutral, warm, or cool color preferences on the web front viewable on an electronic display for the user to preview the effect of the preferences so that he/she can make a selection. In another example, physical prints of images with different preferences can be mailed to the customer. These sample printed images can include images uploaded by the customer. The same digital image can be printed in accordance with different preferences. The physical example prints can be referred to by the customer when making future print orders.

As described above, customer preferences for image processing can be user-based or image-based. User based preferences are global preferences associated with the user. For example, image color preferences for warm images can be specified by a user-based preference. Image-based preferences are specific to an image. A set of image preferences for certain type of images can be defined as an image style.

Figure 5A:
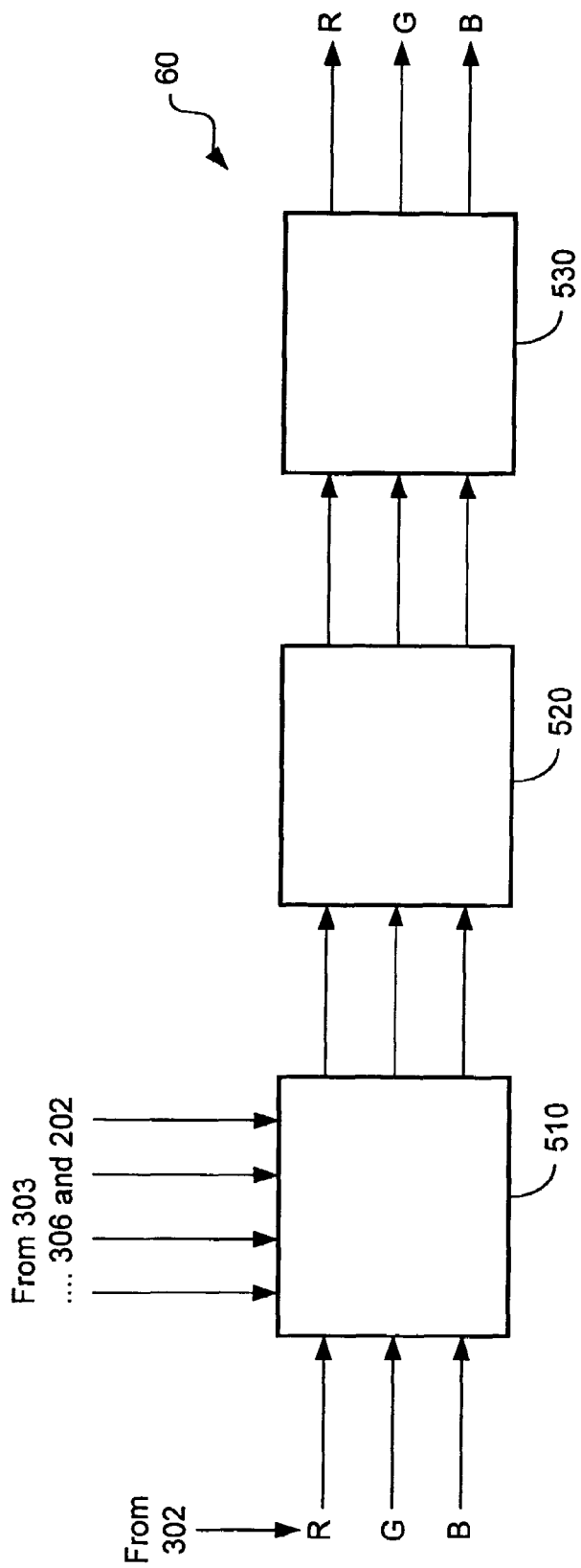
FIG. 5a shows an example of the image processing operations performed by an image processor for personalizing image data.
Figure 5B:
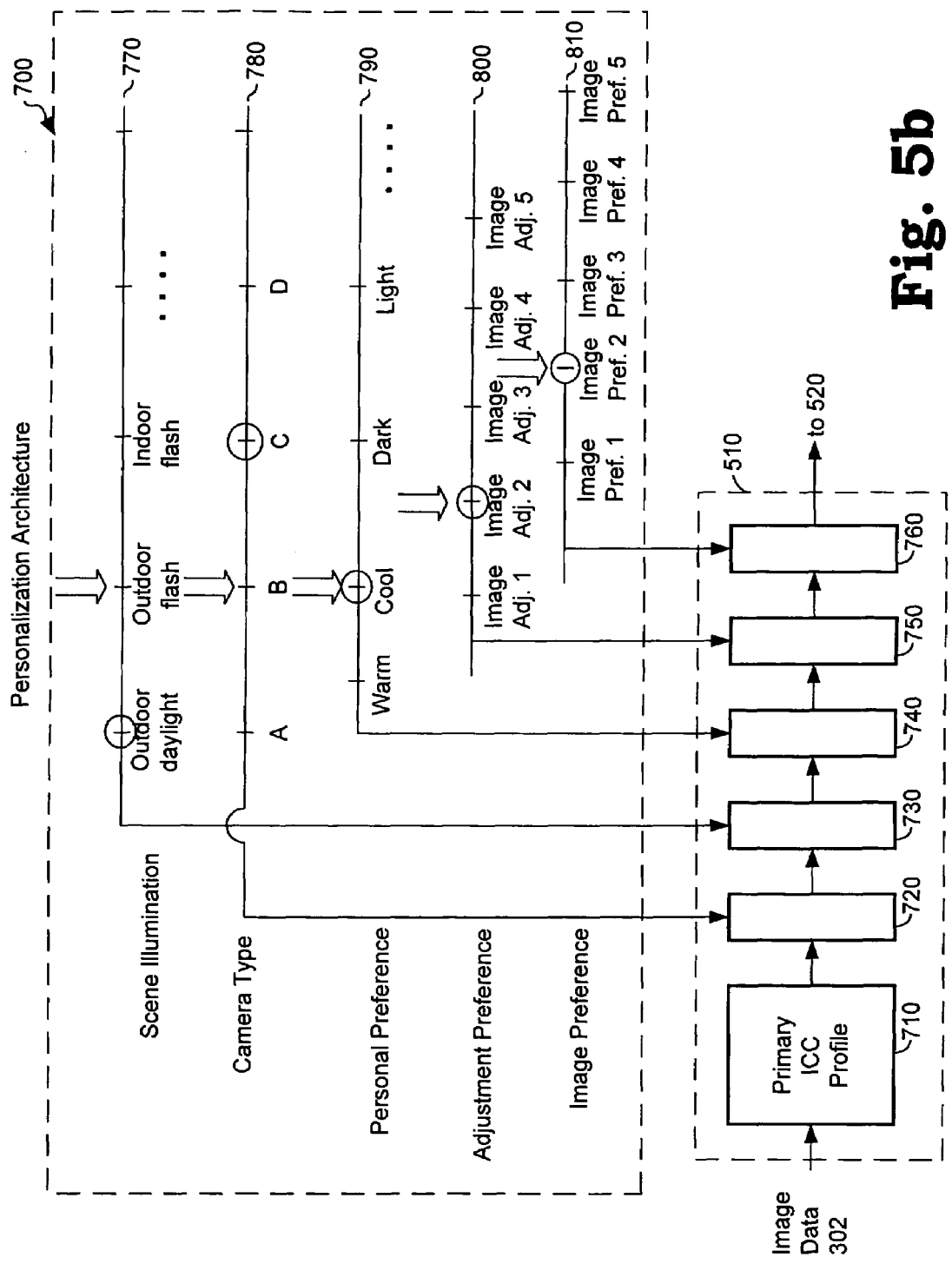
FIG. 5b illustrates an example of a personalization architecture and its interactions with the color processing operations performed by the image processor.

An image style is a named set of image preferences that can be applied to one or more images that share similar image content. For example, an image style can be created for portrait images characterized by flesh tone illuminated by well controlled lighting sources. An un-sharpening operation can be applied to soften the look of the face. In another example, an image style can be generated for a landscape image in which more saturated blue and green colors are often preferred. When the image style is applied to a selected image, as described in more detail below, all of the image preferences in the set are applied to the selected image by the image processor 60 (FIG. 5*b*).

Figure 4C:
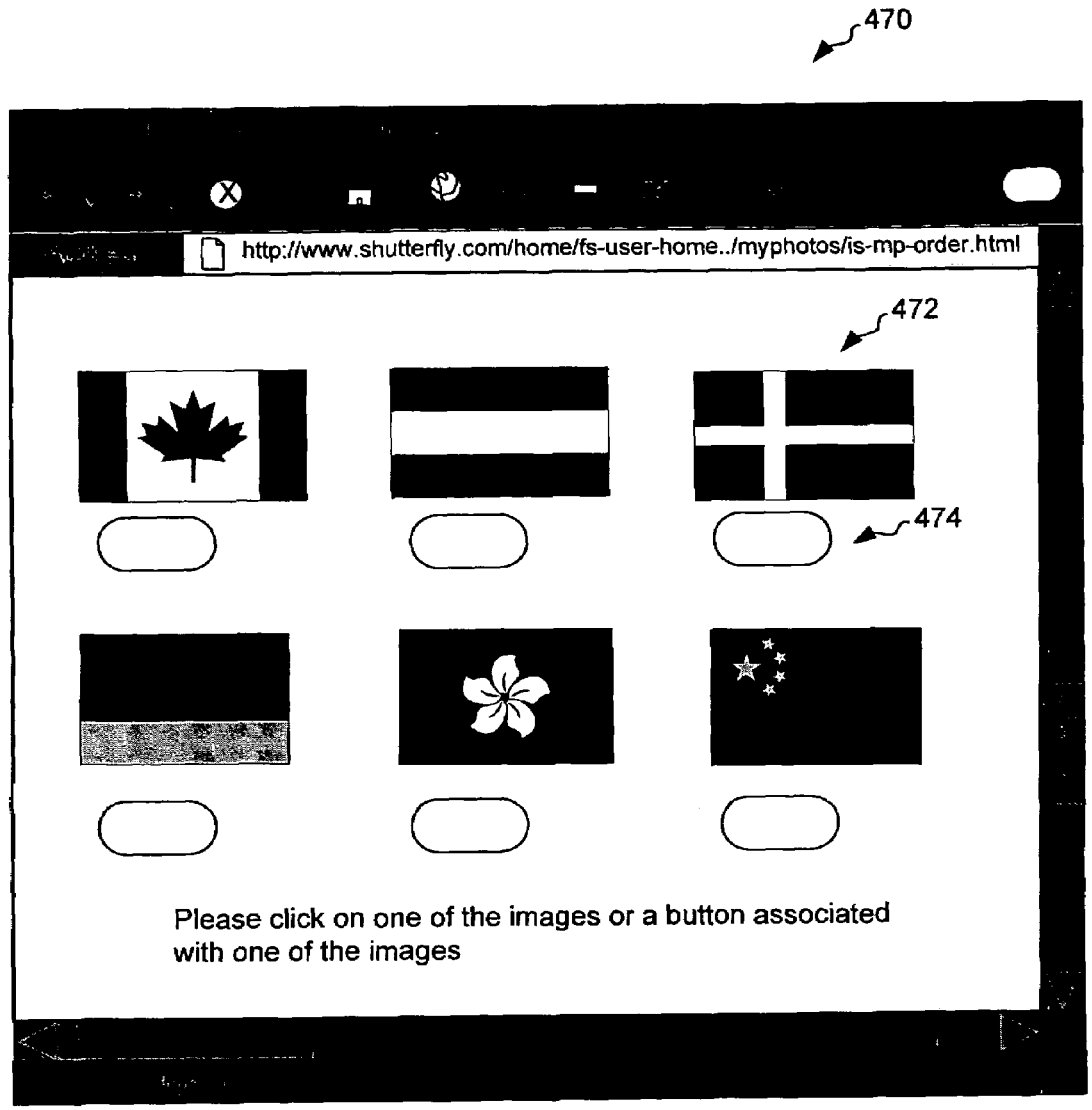
FIG. 4c shows an example of a user interface that enables users to select an image for processing.

Continuing in the process for offering an image-based product, an image is selected for processing (block 406). FIG. 4*c* shows one example of a user interface 470 that can be used to allow a user to select an image for subsequent processing. A plurality of "thumbnail" versions 472 of images stored in the user image database 50 (also referred to here as "thumbnails") are displayed in the user interface 470. The user interface 470 can be configured in a conventional manner so that a user can select a particular image by clicking on the thumbnail 472 associated with that image. In addition, or instead, the user interface 470 can include a plurality of buttons 474 (or other user interface controls) associated with one or more images stored in the user image database 50. A user can click on (or otherwise actuate) one of the buttons 474 in order to select the one or more images associated with that button 474. The selected image is then retrieved from the user image database 50 and used for subsequent processing. The image can be received and selected in other ways, including for example, as an attachment to an email or embodied on a storage medium such as photograph, a flash memory card or CD-ROM.

Figure 4D:
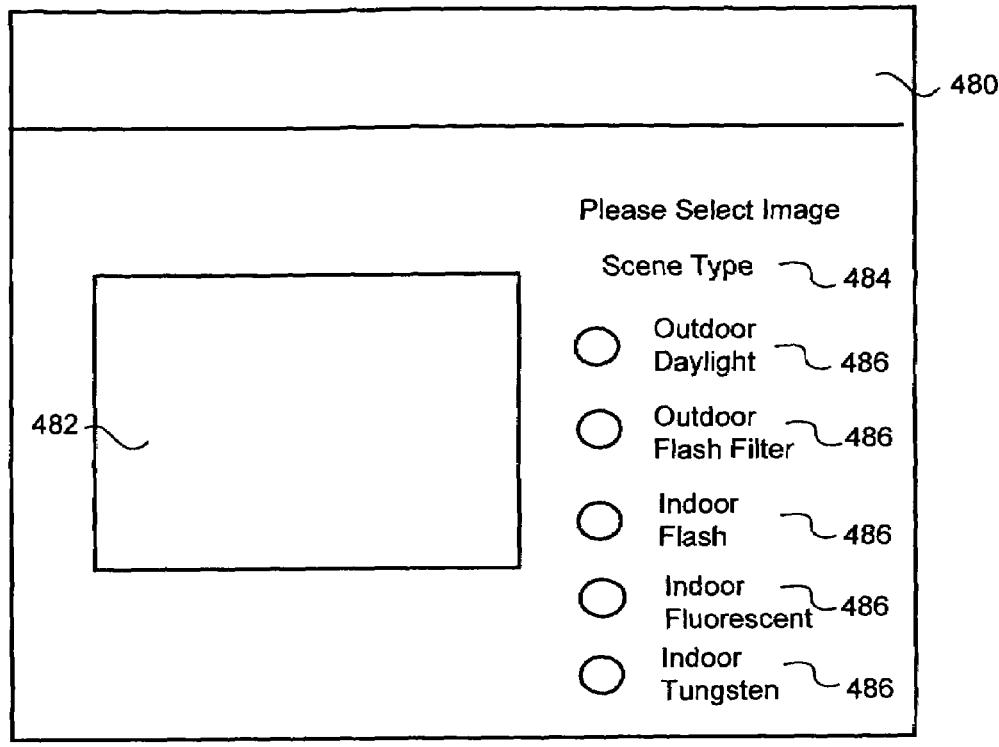
FIG. 4d shows an example of a user interface that enables users to input image preferences.

After an image is selected for processing one or more image-based preferences (e.g., image styles) can be associated with the image (block 408). FIG. 4*d* shows one example of a user interface 480 that can be used to allow a user to select image-based preferences for image processing. The user interface can include a preview window 482 for presenting an image stored in the user image database 50. The image can be the selected image or another image. In addition, the user interface 480 includes a scene/illumination selection 484 and one or more possible selections 486. The user interface 480 can be configured in a conventional manner so that a user can select a particular preference by clicking on a selection presented in the interface. An item menu (not shown) can be manipulated to scroll through the various image-based preference items. As described above, the preview window 482 can present an image. The image can be processed based on the user selection to provide a visual feedback to the user for a given selection. In addition, or instead, the user interface 480 can include a plurality of buttons 488 (not shown) (or other user interface controls) associated with one or more preference items stored in the user image database 50. A user can click on (or otherwise actuate) one of the buttons 488 in order to select the one or more user preferences associated with that button 488. The preview image can then processed in accordance with the selection and presented to the user in the preview window. The image-based preferences can be received and selected in other ways, including for example, as an attachment to an email or embodied on a storage medium such as photograph, a flash memory card or CD-ROM.

Ultimately, a preview image for an image-based product incorporating the selected image and processed in accordance with both the user-based preferences and image-preferences is displayed (block 410 shown in FIG. 4*a*). As noted above, an image-based product is an item, regardless of medium, that includes a visual representation of at least a portion of one or more images. Examples of image-based products include image prints, buttons, posters, mugs, clothing, and cards in which at least a portion of one or more images is printed or otherwise incorporated or embodied. A preview image is a visual representation of an image-based product incorporating the selected image. The preview image is displayed in order to give the user an idea of what an image-based product incorporating the selected image will look like. Proper textures can be applied to simulate the visual environment in two or three dimensions. If the customer is satisfied with the preview (block 412), an order can be placed. Alternatively, the user can change the image or customer preferences (either user-based or image-based preferences) until a satisfactory result is produced.

Next, an order is received for an image-based product incorporating the selected image (block 414). For example, the order can be received by the web front end 40 from the customer's client computer 20. The order can be received in other ways including, for example, via electronic mail, Internet Relay Chat, the telephone, and/or the mail. Typically, the order will include information specifying (or otherwise referring or pointing to) a type of image-based product, the image to incorporate into the image-based product, a quantity of the image-based product being ordered, payment information, and delivery information. After the order has been received, the order is fulfilled (block 416). For example, the order can be fulfilled by printing or otherwise generating the image-based product and delivering the product to the customer.

Image Processing

Image processor 60 can perform many image processing operations well known in the art. The operations can be selected from the group of neutral balance, tonal adjustment, color correction and mapping, sharpening, resizing, and the like. For example, FIG. 5a illustrates a color processing operation that can be performed by the image processor 60. As described above, the input device that produced a selected image can be a digital camera, a reflective scanner, or a film scanner. The input digital image data (stored in image data 302) can be defined in terms of the RGB color space.

In the color processing operation, the image data is operated on by an input device model 510 to produce data that is particular to the input device type and user preferences. That is, in a first operation performed in the input device model 510, the gamut of the input color space is transformed to a device-independent color space such as CIE L*a*b*. In a second operation, the input device model 510 applies one or more preferences to the image data. In the second operation, input device type information (image capture information 303), image content information 304, image adjustment information 305, image preference information 306 and user preference information 202 is retrieved and applied by the image processor 60 to the image data 302. The input device model 510 performs the indicated operations to produce personalized image data in an input color space.

The personalized image data is operated on by a color mapping function 520 to produce data that is mapped to the gamut of the output device. More specifically, the color mapping function maps the input color gamut to the output color gamut. Typically the output color gamut has a different shape than the input color gamut.

As a final step in the color processing operation, an output-device model 530 is applied to transform the personalized and gamut adjusted image data to the output color space (RGB, CMY, CMYK, etc.). The output device model 530 is analogous to the input device model and includes two basic operations. First, any personalization operations for the output model are applied to the image data. One or more personalization filters may be applied to the image data in this step. These output device model personalization operations are performed in a device independent color space, prior to the second basic operation. In the second basic operation, the image data is converted to the output device specific color space.

Color management processes are described in greater detail in co-pending and commonly assigned United States Patent Application entitled "AUTOMATIC COLOR ADJUSTMENT and PRINTER CALIBRATION", filed Nov. 19, 1999 and assigned Ser. No. 09/450,347, the contents of which are expressly incorporated herein by reference.

Personalization Architecture

FIG. 5b illustrates an architecture for retrieving and automatically processing user image preference information. An "input" personalization architecture 700 is shown to interact with the input device model 510. The personalization architecture 700 can include a plurality of preference layers. Each of the individual layers, may include sublayers defining one or more operations in a set of operations to be performed.

Camera-type layer 770 includes selections for different camera types (e.g., A, B, C and D). In the implementation shown, the camera-type layer 770 includes different camera types such as the Nikon CoolPix 950, Kodak DC 290, Epson PC 800, or Olympus C2000L as specified in the image capture information 303.

Scene/illumination layer 780 includes selections for outdoor daylight, indoor flash, incandescent, fluorescent etc. The scene/illumination layer 780 can also include other related data that forms part of the image content information 304.

Color-preference layer 790 includes selections for warm, cool, dark, light, saturated and softer color preferences. The color-preference layer 790 can be used to capture the personal preferences of the user on color and tones as described in the user preference information 202.

Adjustment layer 800 can be used to capture image adjustments set forth in the image adjustment information 305.

Image preference layer 810 can include specific image based preferences to be applied as set forth in the image preference information 306. In one implementation, the image preference layer 810 can include the designation of an image style.

Each preference layer includes a plurality of selections each characterized by a different selection value. The selection values from the personalization architecture 700 are provided to the input device model 510.

In FIG. 5b, an example of the color processing operations in accordance to the present invention is shown using the color management tools of the International Color Consortium (ICC). A color ICC profile is a color transform to and from a device-independent color space. A series of ICC profiles is implemented to achieve the input device model. A primary ICC profile 710 is first applied to the image data 302. The primary ICC profile 710 transforms the input device gamut from the input color space to a device-independent color space. In other words, the primary ICC profile 710 describes the color properties of the input device.

Zero or more secondary profiles (secondary profiles 720–760 in FIG. 5*b*) are subsequently applied sequentially in response to the selection values from the different preference layers. The selection values from each layer indicates the type of secondary profiles to be applied corresponding to each preference layer. According to the definition of the ICC Profiles Classes, the secondary profiles are referred to as "abstract profiles". For example, the camera type selection can be used to correct the particular color imbalance or contrast problems in a specific camera. These camera specific problems can be corrected by the secondary ICC profile 720. In another example, the scene/illumination selection affects the color and tone adjustment in the image processing, and is implemented in secondary profile 730. In one implementation, if no selection is made by a user or if no selection is inferred from user activity for any layer in the personalization architecture 700, a default secondary profile from the selections can be used. In another implementation, if no selection is made for any layer in the personalization architecture 700, a default primary ICC profile is applied that provides color characteristics that are optimized to the average consumer.

Users can provide their own secondary ICC profiles (e.g., "custom" profiles) for creating preferred color characteristics in their printed images. A user can upload these custom profiles to the web server of the on-line photofinishing provider. A custom profile can be incorporated in the chain of image processing operations by selecting the particular custom profile from the available profile selections in the personalization architecture.

As described above, after the color mapping operation, the image data is processed in an analogous process in the output device model 530. Just as with the input device model 510, the output device model 530 includes zero or more secondary (abstract) ICC profiles and a primary ICC profile that transforms from the device-independent space to the output device color space. Analogous to the input device model, the secondary profiles are dependent on the selection values at the personalization layers in an "output" personalization architecture. For example, the personalization architecture can include an output media layer. The selections in the output media layer can include canvas, glossy receiver, soft display, fabric and the like.

Default color characteristics can be applied in the absence of selections for secondary ICC profiles in the input device model 510 and the output device model 530. In one implementation, the default color characteristics are designed to produce a result that is most appealing to the average consumer. One type of default color characteristics simulates traditional silver halide photograph processing.

Those of ordinary skill in the art will recognize that the separation of the personalization architecture(s) from the input and output device model provides added flexibility in the system.

As described above, the selections can be made manually or can be assisted by automatic detection methods. For example, the neutral balance of a digital image can be automatically detected and an appropriate selection made from the available neutral balance selections without requiring user input.

In another implementation, a set of selections across different preference layers can be combined to form an image style for the input device model. For example, an indoor party scene for children involving a great number of colorful objects illuminated by a flashlight can be captured as an image style having a fixed selection of elements in the personalization architecture (Indoor/flash, Camera B, Warm, etc.) for the preference layers 770–810. The set of secondary ICC profiles 720–760 corresponding to the style selection can be combined into a single input style profile. In another example, an image style profile can be created for portrait images characterized by flesh tone illuminated by well controlled lighting sources. In addition to the color preferences, an un-sharpening operation can be applied to soften the look of the face. In yet another example, a style profile can be generated for a landscape image in which more saturated blue and green colors are often preferred.

For each user, a plurality of style profiles can be provided or otherwise created. Each style profile only need be computed once. The capability of selecting styles and the application of style profiles shortens the number of image processing steps for each digital image.

The selection of personal preferences or styles is not limited to what is disclosed herein. The web front-end interface can provide choices in preferences or styles in anticipation of user needs. Moreover, styles or preferences can be randomly provided and demonstrated to stimulate the user's imagination.

Although the preference selections were shown to interact with the input device model in the color mapping process, they can also similarly be set up to interact with the output device model 530 as described above.

A number of embodiments have been described. Nevertheless, it will be understood that various modifications may be made without departing from the spirit and scope of the invention. For example, advantageous results still could be achieved if steps of the disclosed techniques were performed in a different order and/or if components in the disclosed systems were combined in a different manner and/or replaced or supplemented by other components. Accordingly, other embodiments are within the scope of the following claims. What is claimed is:

The invention claimed is:

1. A personalization architecture for producing a personalized image-based product based on an input digital image, comprising:

a personal preference layer including one or more personal preference selections, wherein the personal preference layer defines a first image operation to be applied to a digital image in accordance with the selection of the personal preferences;

an image adjustment layer including one or more image adjustment selections, wherein the image adjustment layer defines a second image operation to be applied to a digital image in accordance with the selection of the image adjustments;

an image preference layer including one or more image preference selections, wherein the image preference layer defines a third image operation to be applied to a digital image in accordance with the selection of the image preferences, wherein the first image operation, the second image operation, and the third image operation can be applied to the input digital image to produce a processed digital image to be used for producing the image-based product; and a scene illumination layer including one or more scene illumination selections, wherein the scene illumination layer defines a fourth image operation to be applied to a digital image in accordance with the selection of the scene illuminations.

2. The personalization architecture of claim 1, wherein the personal preference selections include preferences for tone to be used in processing the image.

3. The personalization architecture of claim 1, wherein the personal preference selections include preferences for color to be used in processing the input digital image.

4. The personalization architecture of claim 1, wherein the image preference selections include a style specification, the style specification defining a group of one or more individual preferences to be applied to the input digital image.

5. The personalization architecture of claim 1, wherein the personal preference selections include a style specification, the style specification defining a group of one or more individual preferences to be applied to the input digital image.

6. The personalization architecture of claim 1, wherein the input digital image is received by a server at a web site from a remote computer.

7. The personalization architecture of claim 6, wherein at least one of the first image operation, the second image operation, and the third image operation can be applied to the input digital image at the web site to produce the processed digital image.

8. The personalization architecture of claim 7, wherein a preview image of the image-based product is generated using the processed digital image.

9. The personalization architecture of claim 8, wherein the preview image of the image-based product is sent to a remote computer from the web site.

10. The personalization architecture of claim 1, wherein at least one of the first image operation, the second image operation, and the third image operation can be applied to the input digital image without a user selecting one of the personal preferences, image adjustments, or image preferences.

11. The personalization architecture of claim 1, wherein the first image operation can be applied to the input digital image in accordance with a personal preference that is inferred from the usage information of a user.

12. The personalization architecture of claim 1, wherein the first image operation can be applied to the input digital image in accordance with a personal preference selected by a user.

13. The personalization architecture of claim 1, wherein the image preferences include one or more image styles.

14. The personalization architecture of claim 1, wherein the personal preferences can be applied to a plurality of image-based products produced for a user.

15. The personalization architecture of claim 1, wherein at least one of the image preferences is determined by the image content of the input digital image.

16. The personalization architecture of claim 1, wherein at least one of the first image operation, the second image operation, and the third image operation includes an image transform based on an ICC (International Color Consortium) profile.

17. The personalization architecture of claim 1, further comprising a database configured to store one or more of the personal preferences, image adjustments, or image preferences.

18. The personalization architecture of claim 1, wherein the selection of the scene illuminations includes a selection for input ambient conditions.

19. The personalization architecture of claim 1, wherein the selection of the scene illuminations includes a selection for color balance.

20. The personalization architecture of claim 1, wherein the image preference selections include a selection for image effects.

21. The personalization architecture of claim 1, wherein the input digital image is received from a first user and the image-based product is sent to a second user.

22. The personalization architecture of claim 1, wherein at least one personal preference is obtained from a user's use history on a web browser.

23. The personalization architecture of claim 1, further comprising a camera type layer including one or more camera type selections, wherein the camera type layer defines a fourth image operation to be applied to a digital image in accordance with the selection of the camera types.

24. A method for producing a personalized image-based product based on an input digital image, comprising:
    applying a first image operation, a second image operation, and a third image operation to the input digital image to produce a processed digital image to be used for producing the image-based product, wherein the first image operation is applied in accordance with the selection of personal preferences in a personal preference layer, wherein the second image operation is applied in accordance with the selection of image adjustments in an image adjustment layer, and wherein the third image operation is applied in accordance with the selection of image preferences in an image preference layer,
    wherein the personal preference is acquired from the user history on a web browser.

25. The method of claim 24 wherein the personal preference is acquired from a database.

26. The method of claim 24, further comprising:
    producing the image-based product using the processed digital image; and
    sending the image-based product to a user.

* * * * *